United States Patent
Michoux et al.

(10) Patent No.: US 7,061,753 B2
(45) Date of Patent: Jun. 13, 2006

(54) COMPUTER MONITOR BASE WITH HEIGHT ADJUSTMENT

(75) Inventors: Laurent Michoux, San Jose, CA (US); Dean Depay, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 10/692,982

(22) Filed: Oct. 24, 2003

(65) Prior Publication Data
US 2005/0088808 A1 Apr. 28, 2005

(51) Int. Cl.
*G06F 1/16* (2006.01)
(52) U.S. Cl. .................. 361/681; 248/371; 248/917
(58) Field of Classification Search ........ 361/680–683; 248/276.1, 278.1, 281.11, 284.1, 371, 917–923; 16/376; 297/423.41, 423.39; 349/50, 60
See application file for complete search history.

(56) References Cited

U.S. PATENT DOCUMENTS

| | | | | |
|---|---|---|---|---|
| 5,501,420 A | * | 3/1996 | Watt et al. ............. | 248/280.11 |
| 5,765,797 A | * | 6/1998 | Greene et al. ............. | 248/398 |
| 5,812,368 A | * | 9/1998 | Chen et al. .............. | 361/681 |
| 5,831,696 A | * | 11/1998 | Sheng ...................... | 349/58 |
| 5,833,183 A | * | 11/1998 | Chang .................... | 248/176.1 |
| 6,102,353 A | * | 8/2000 | Dichter .................... | 248/371 |
| 6,695,274 B1 | * | 2/2004 | Chiu ....................... | 248/371 |
| 6,766,994 B1 | * | 7/2004 | Serbinski et al. ........... | 248/371 |

OTHER PUBLICATIONS

Compaq Tablet PC TC1000 Product Details, Webpages [online] [retrieved on Jul. 18, 2003]. Retrieved from the Internet:< URL:http://h18000.www1.hp.com/products/tabletpc/tc1000.html Total pages: 2.

The Apple Store (US). Choose your iMac. Webpages [online] [retrieved on Jul. 11, 2003]. Retrieved from the internet: < URL:http://store.apple.com/1-800-MY-APPLE/WebObjects/AppleStore.woa/72501/wo/BYtwH Total pages: 2.

IMac Specification Sheet. Webpages [online] [retrieved on Oct. 16, 2003]. Retrieved from the Internet: http://manuals.info.apple.com/Apple_Support_Area/Manuals/specs/imac_fp/L25934A_EN.pdf Total pages: 2.

PressPass—Information for Journalists. Tablet PC: The Laptop Evolves Into a True Mobile Computer, Webpages [online] [retrieved on Jul. 18, 2003]. Retrieved from the Internet:< URL:http://www.microsoft.com/presspass/features/2001/nov01/11-11tabletpc.asp Total pages: 5.

* cited by examiner

*Primary Examiner*—Michael Datskovskiy

(57) ABSTRACT

Embodiments of the invention provide an apparatus for supporting a computer monitor. The apparatus comprises a computer monitor base that includes a bottom portion for placement on a surface, a link coupled to the bottom portion, and a monitor support member coupled to the link. A tilt angle of the monitor support member is dependent on an adjustable height of the link.

24 Claims, 12 Drawing Sheets

COMPUTER MONITOR BASE WITH HEIGHT ADJUSTMENT

TECHNICAL FIELD

Embodiments of the present invention relate generally to a base for a computer monitor such as, for example, a liquid crystal display.

BACKGROUND

Various types of computer panel displays are currently available. For example, the iMac® from APPLE COMPUTER, INCORPORATED provides a widescreen flat-panel display that can be adjusted in height or tilt angle. However, this product requires the manual adjustment of both the display height and display tilt angle. Furthermore, this product requires complex parts and is costly to manufacture and assemble. Therefore, this product is provided at a higher cost to a consumer.

Another previous solution for mounting a liquid crystal display (LCD) or other computer monitors is by providing a fixed structure for mounting the LCD. This previous solution did not have spring effects to help in the adjustment of the LCD position. Furthermore, the range of motion for adjusting the LCD position was limited. Therefore, the ergonomic capabilities for previous solutions for LCD mounts were limited.

Therefore, the current technology is limited in its capabilities and suffers from at least the above constraints and deficiencies.

SUMMARY OF EMBODIMENTS OF THE INVENTION

Embodiments of the present invention provide an apparatus for supporting a computer monitor. In one embodiment, the apparatus comprises a computer monitor base that includes a bottom portion for placement on a surface, a link coupled to the bottom portion, and a monitor support member coupled to the link. A tilt angle of the monitor support member is dependent on an adjustable height of the link. The tilt angle increases in response to a decrease in the height. The tilt angle decreases in response to an increase in the height. The monitor support member is configured to be attached to a computer monitor. A plurality of springs is coupled to the link and is configured to counter-balance a weight of the computer monitor that is attached to the monitor support member.

In another embodiment of the invention, a method of assembling an apparatus for supporting a computer monitor, includes: assembling a bar link that includes a spring mechanism and screw elements 165; attaching a computer monitor support member to the bar link; and attaching the bar link to a base bottom portion.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

An embodiment of the invention advantageously increases the ergonomic capabilities of a suitable computer monitor, such as, for example, an LCD monitor or panel or other types of suitable computer monitors. The height of a computer monitor can be adjusted with minimal efforts from the user, due to a spring mechanism that is provided by an embodiment of the invention.

An embodiment of the invention also increase the range of adjustment for the height of the computer monitor, and links the tilt range of the computer monitor with the height position of the computer monitor.

An embodiment of the invention may also permit a suitable computer monitor (e.g., a suitable LCD monitor) to be used as a computer writing tablet.

An embodiment of the invention also advantageously saves in the cost for shipment, since the computer monitor base can be made compact by folding the bar links of the computer monitor base. This permits additional computer monitor base assemblies to be placed in packages for shipment.

An embodiment of the invention also advantageously provides a computer monitor base that is less expensive to manufacture and assemble, compared to previous monitor base assemblies.

Figure 1:
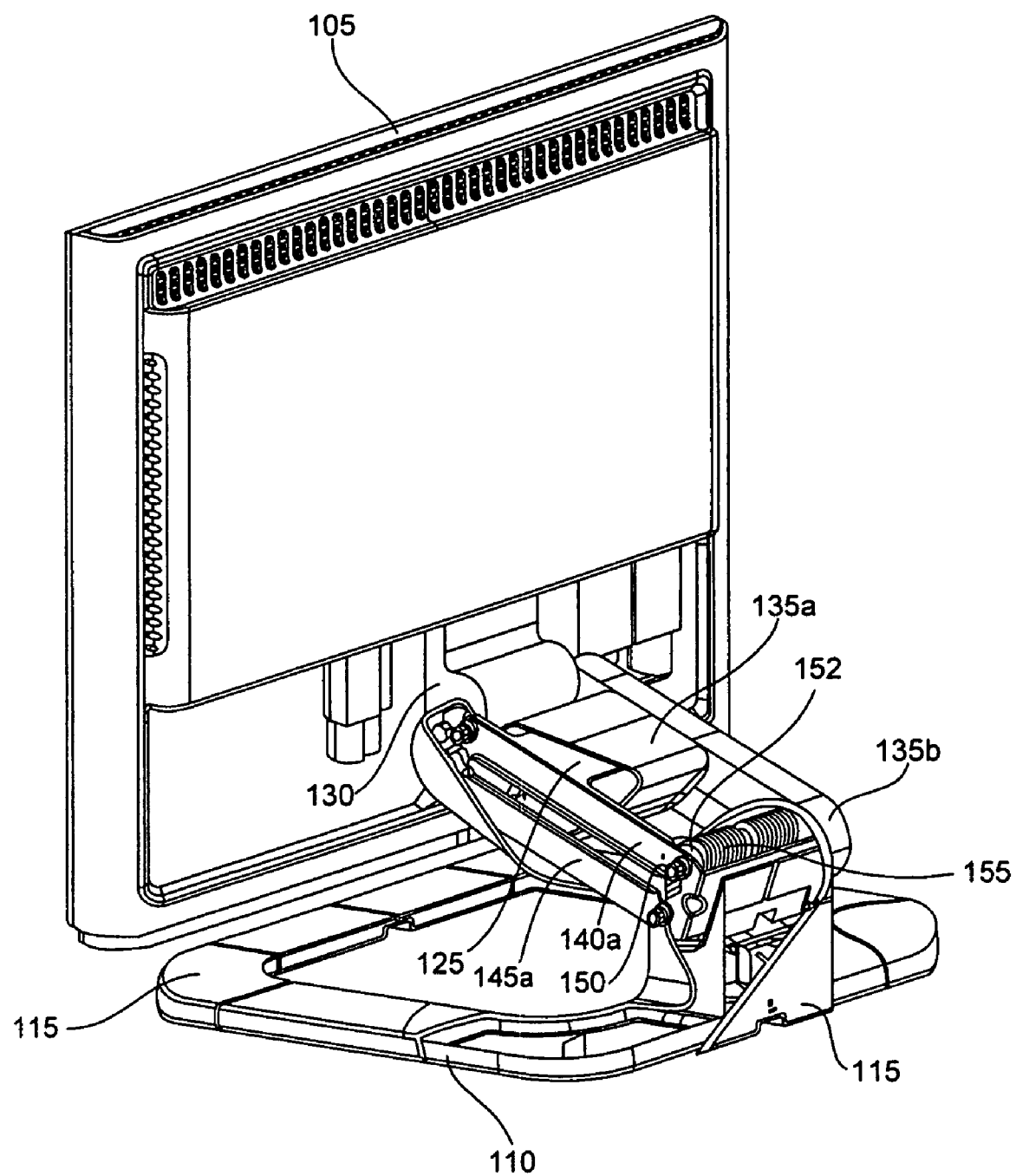
FIG. 1 is a block diagram of a computer monitor base, in accordance with an embodiment of the invention.
Figure 2:
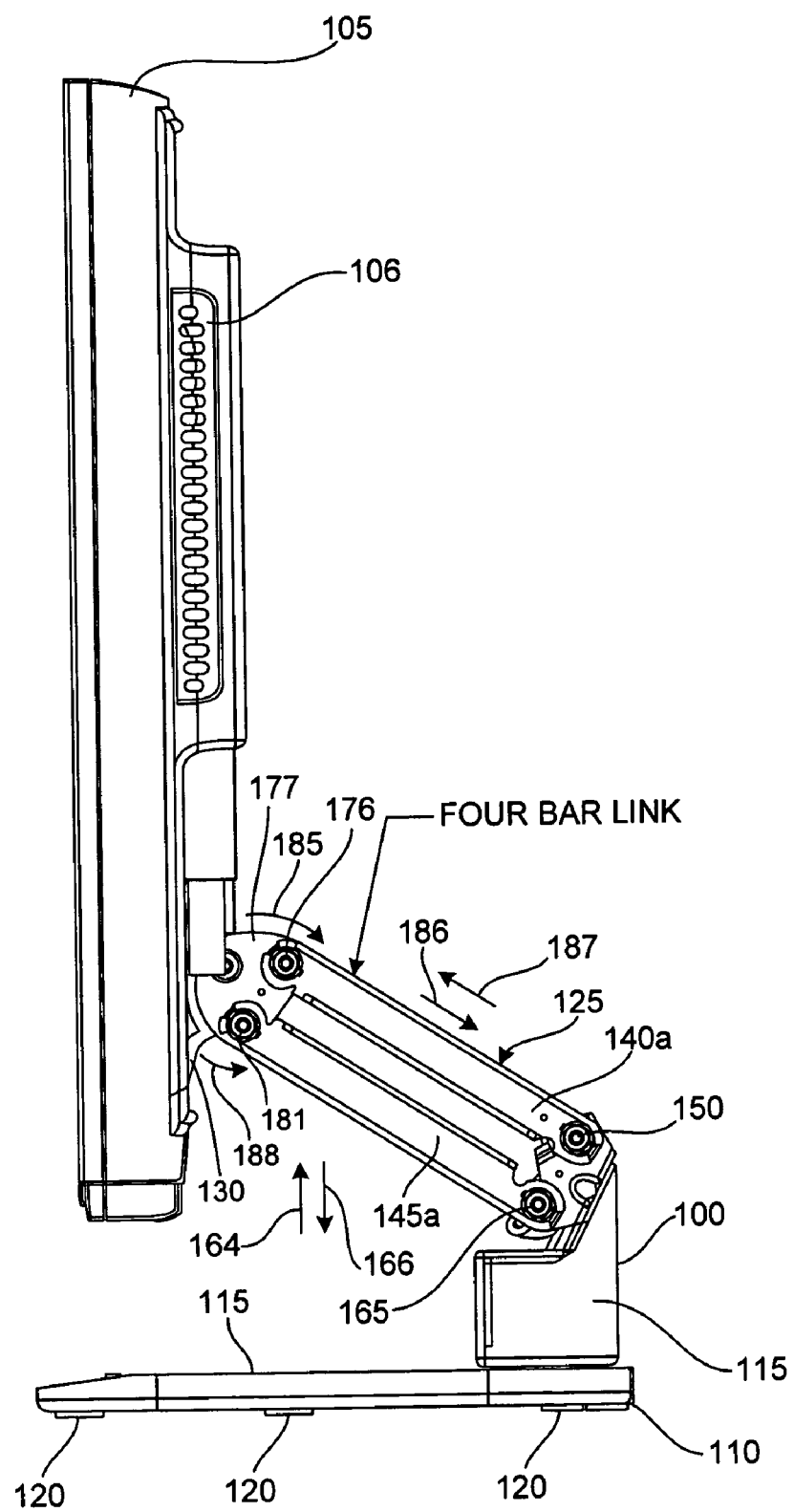
FIG. 2 is a block diagram of a side view of the computer monitor base of FIG. 1, in accordance with an embodiment of the invention.

Reference is first made to FIG. 1 and FIG. 2. FIG. 1 is a block diagram of a computer monitor base 100, in accordance with one embodiment of the invention. FIG. 2 is a side view of the computer monitor base 100 of FIG. 1. The monitor base 100 is configured to support a computer monitor 105, such as for example, a liquid crystal display (LCD) monitor or other types of suitable computer monitors.

Although the computer monitor 105 is shown as including interface (pin connectors) 106 for receiving wired connections, the computer monitor 105 may have other suitable configurations or designs such as, for example, other types of interfaces.

The monitor base 100 includes a base bottom portion 110 which is placed on a surface (e.g., desk or table surface) in order to provide stable support for the monitor base 100 and for the attached computer monitor 105. A base cover 115 is typically used to cover various portions of the computer monitor base 100. For example, the base cover 115 can cover the top portion of the bottom portion 110. The base cover 115 is typically formed by a suitable material such as, for example, plastic.

Pads 120 are typically attached under the bottom portion 110 to provide friction between the computer monitor base 100 and a surface that supports the computer monitor base 100. Therefore, the pads 120 help to prevent the computer monitor base 100 from substantially sliding on the surface that supports that monitor base 100. However, other suitable types of elements to substantially prevent the sliding of the computer monitor base 100 may alternatively be used.

In an embodiment, the monitor base 100 includes a bar link 125 that links the base bottom portion 110 with a monitor support member 130 that is attachable to the computer monitor 105. The bar link 125 is typically covered by covers 135a and 135b in some portions of the bar link 125. The covers 135a and 135b are a suitable material such as, for example, plastic. Other cover elements that are disclosed herein may also be formed from a suitable material such as, for example, plastic.

Figure 4A:
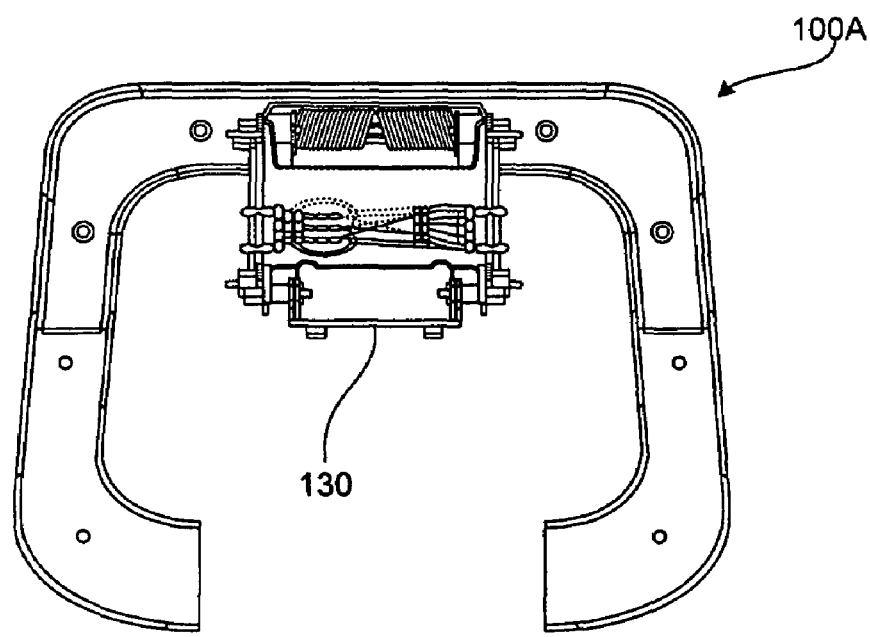
FIGS. 4A to 4F are block diagrams of various views that shows additional details of a computer monitor base, in accordance with an embodiment of the invention.
Figure 4B:
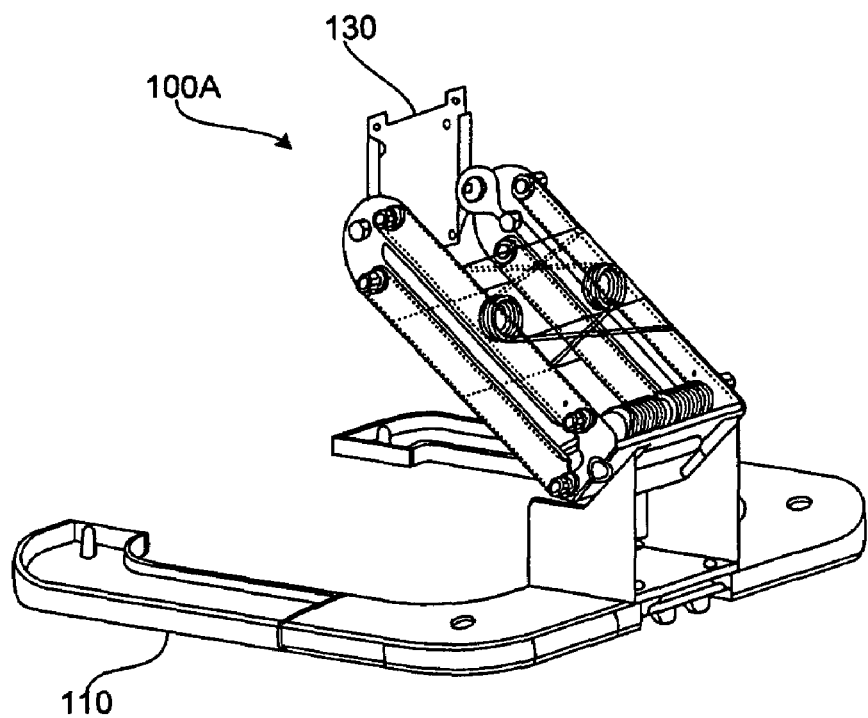
Figure 4C:
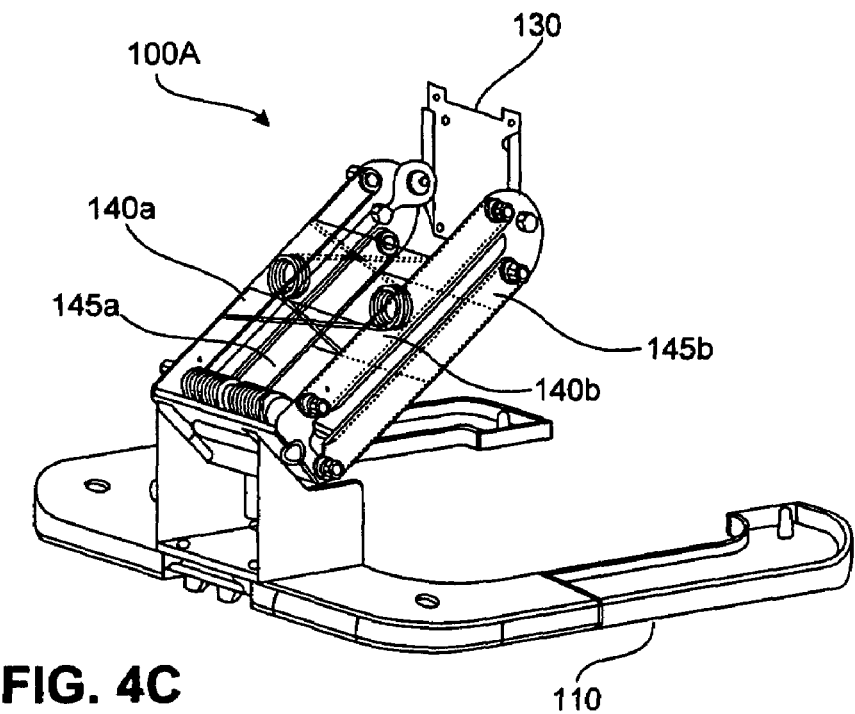
Figure 4D:
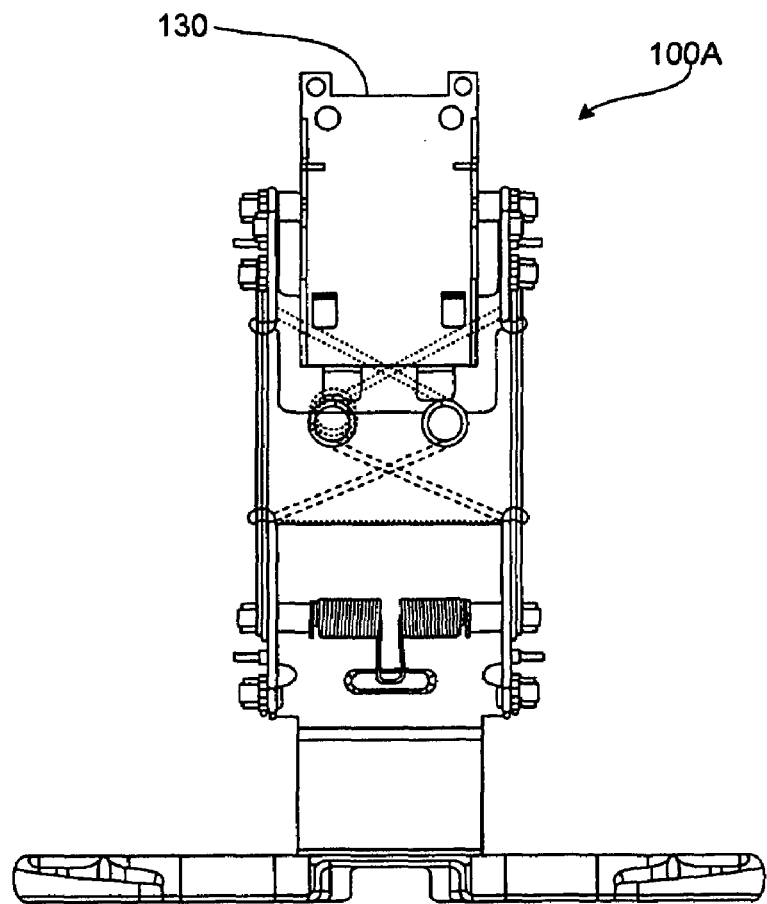
Figure 4E:
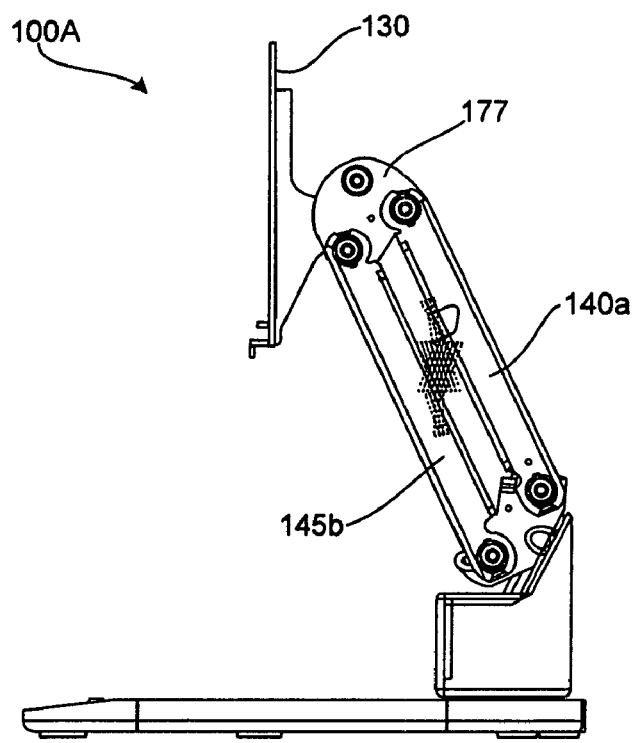
Figure 4F:
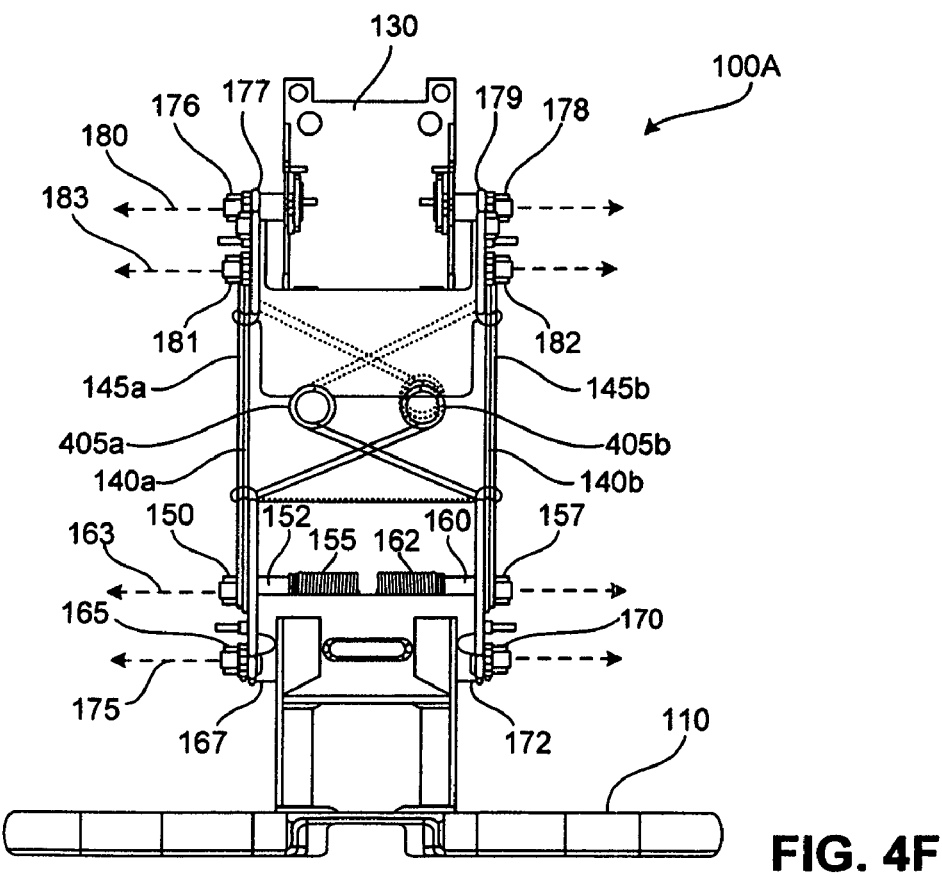

In an embodiment, the bar link 125 is formed by a pair of top bars 140a and 140b (see FIG. 4F) and a pair of bottom bars 145a and 145b (see FIG. 4F). The top bar 140a is attached by screw elements 150 to a fixed member 152. Other suitable types of pins or attachment mechanism may be used instead of screws, in the description of the embodiments of the invention. The fixed member 152 is disposed within an opening of a spring 155. Similarly, as shown in FIG. 4F, the top bar 140b is attached by screw element 157 to a fixed member 160. The fixed member 160 is disposed within an opening of a spring 162 The top bars 140a and 140b can pivot at an axis 163 along fixed members 152 and 160, when the height of the link 125 is moved in an upward direction 164 or in a downward direction 166 (FIG. 2), as discussed below.

The top bar 140a is also attached by screw element 176 to a pivot member 170 (see FIG. 2). Similarly, the top bar 140b is attached by screw element 178 to a pivot member 179. The top bars 140a and 140b can pivot at an axis 180 along the pivot members 177 and 179, when the height of the link 125 is adjusted in the upward direction 164 or in the downward direction 166 (FIG. 2), as discussed below.

The bottom bar 145a is attached by screw element 165 to a fixed member 167 (see FIG. 4F). Similarly, the bottom bar 145b is attached by screw element 170 to a fixed member 172. The bottom bars 145a and 145b can pivot at an axis 175 along fixed members 167 and 172, when the height of the link 125 is adjusted in the upward direction 164 or in the downward direction 166 (FIG. 2), as discussed below.

The bottom bar 145a is also attached by screw element 181 to the pivot member 177 (see FIG. 2 and FIG. 4F). Similarly, the bottom bar 145b is attached by screw element 182 to the pivot member 179. The bottom bars 145a and 145b can pivot at an axis 183 along the pivot members 177 and 179, when the height of the link 125 is adjusted in the upward direction 164 or in the downward direction 166 (FIG. 2), as discussed below.

The link 125, bottom portion 110, monitor attachment member 130, and/or other components of the computer monitor base 100 may be formed from materials such as, for example, metal, plastic, and/or a suitable composite. Preferably, the weight of the computer monitor base 100 is sufficient to provide stable support to a computer monitor 105.

It is also noted that the particular shapes of the components of the monitor base 100, as shown in the drawings, are provided as particular examples. The components of the monitor base 100 may be shaped and/or configured in other suitable manners without departing from the scope of the embodiments of the invention.

Referring again to FIG. 2, if the user would like to lower the height of the monitor 105, then the link 125 is moved in the downward direction 166. At the same time, the pivot members 177 and 178 will automatically pivot in the clockwise direction 176, and the top bars 140a and 140b will slide downward at approximate direction 186, while bottom bars 145a and 145b will slide upward in approximate direction 187, in response to the downward direction 166 movement of the link 125.

On the other hand, if the user would like to raise the height of the monitor 105, then the link 125 is moved in the upward direction 164. At the same time, the pivot members 177 and 178 will pivot in the counter-clockwise direction 188, and the top bars 140a and 140b will slide upward at approximate direction 187, while bottom bars 145a and 145b will slide downward in approximate direction 186, in response to the upward direction 164 movement of the link 125.

FIGS. 3A to 3D are side views of the computer monitor base 10 in various height positions, in accordance with an embodiment of the invention. For purposes of describing the functionalities of embodiments of the invention, the detachable computer monitor 105 is not shown as being attached to the monitor support member 130 of the computer monitor base 100. The height of the link 125 may be defined by the variable height H, as shown in FIGS. 3A to 3D. Assume that the height H is at a maximum value in FIG. 3A, and that the height H is at a minimum value in FIG. 3D. The height H determines the height of a computer monitor 105 that is attachable to the monitor support member 130.

The tilt of the monitor support member 130 may be defined by a variable tilt angle TA, as shown in FIGS. 3A to 3D. Assume that the tilt angle TA is at a minimum value in FIG. 3A, and that the tilt angle TA is at a maximum value in FIG. 3D. The tilt angle TA determines the tilt angle of a computer monitor 105 that is attachable to the monitor support member 130. Additionally, the value of the tilt angle TA varies, depending on the value of the height H. Therefore, an adjustment of the height H will also automatically adjust the tilt angle TA. There is a relationship between the value of the height H and the value of the tilt angle TA.

Figure 3A:
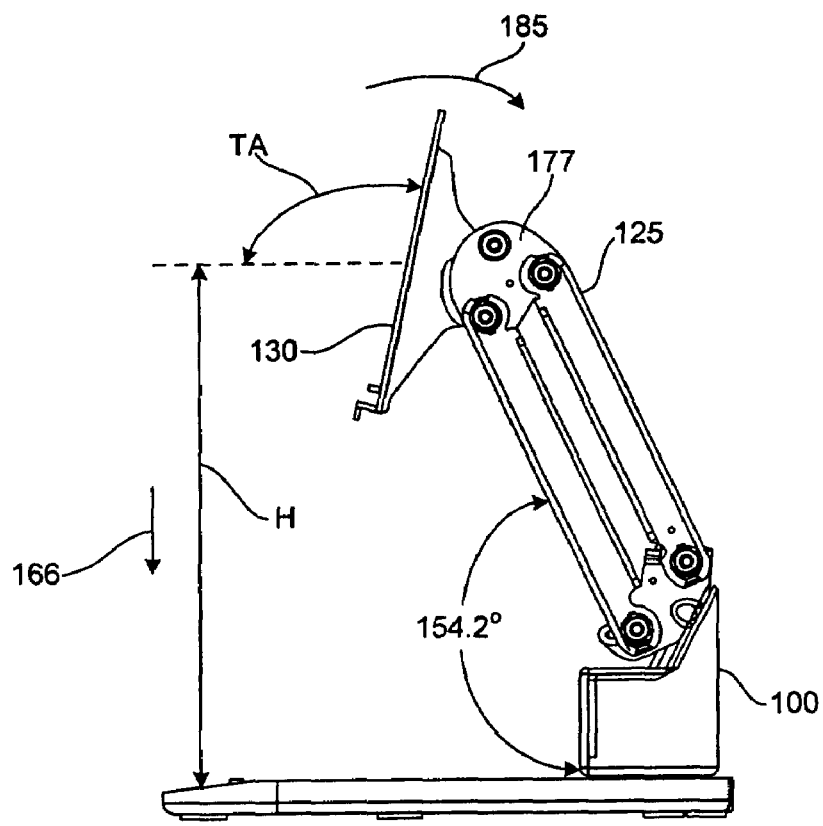
FIGS. 3A to 3D are block diagrams of side views of the computer monitor base in various height positions, in accordance with an embodiment of the invention.

In FIG. 3A, if the height H is reduced by moving the link 125 in the downward direction 166, then the pivot members 177 and 179 (FIG. 4F) will automatically rotate in the clockwise direction 185. Since the pivot members 177 and 179 will rotate clockwise 185, the monitor support member 130 will also automatically rotate in the clockwise direction 185 and the tilt angle TA will increase in value.

Figure 3B:
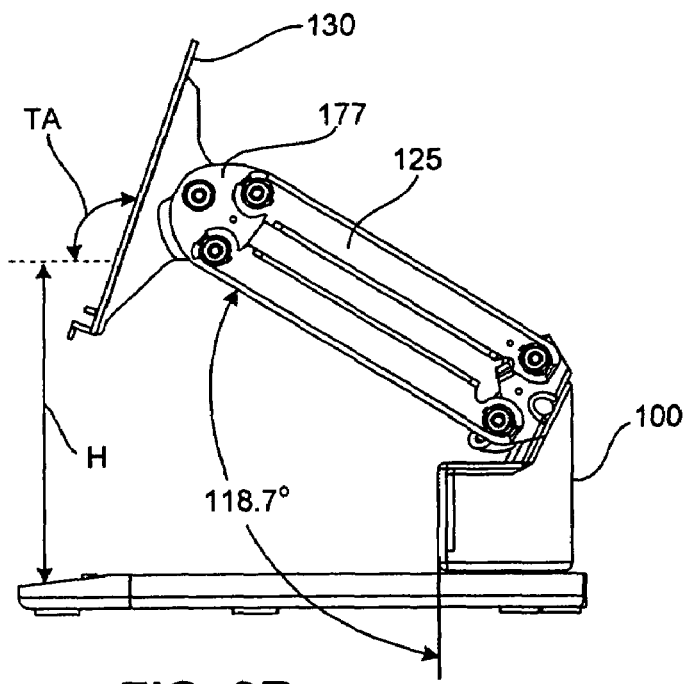
Figure 3C:
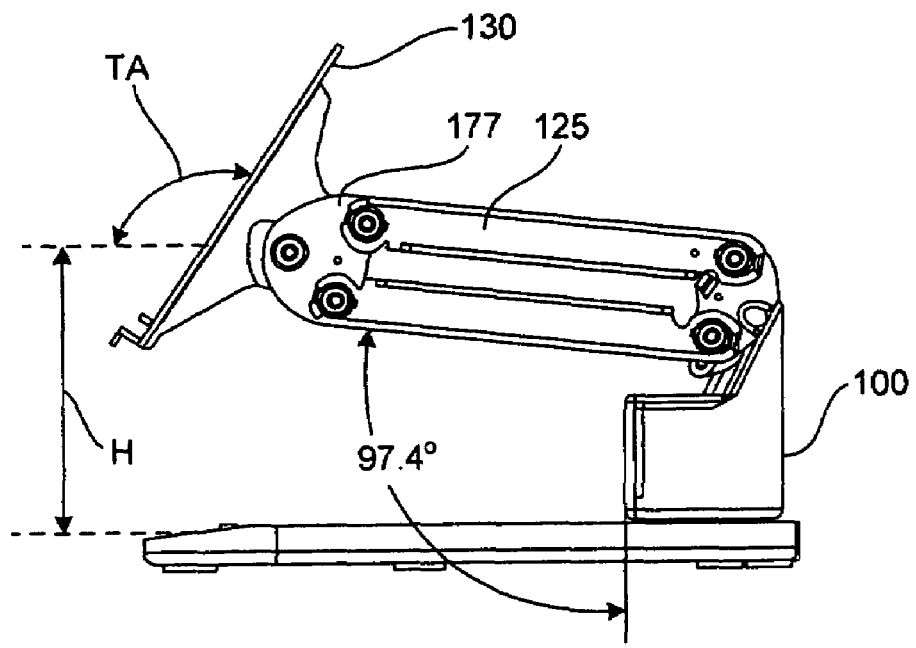
Figure 3D:
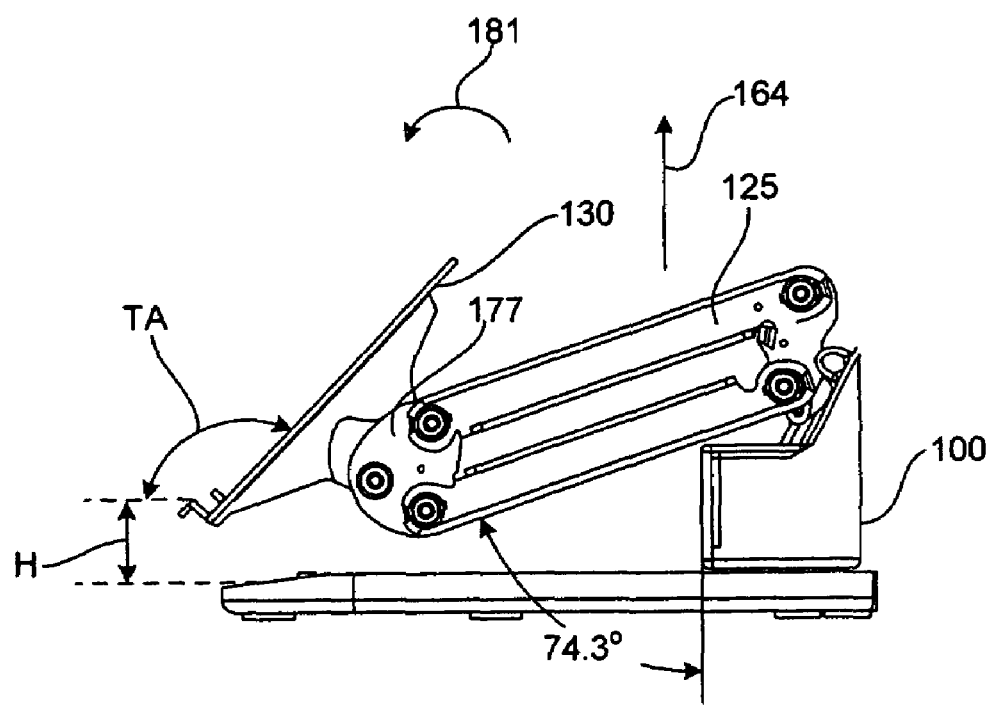

As shown in FIGS. 3B to 3D, as the height H is decreased, the tilt angle TA is increased. The height H affects the tilt angle TA, and so the computer monitor 105 can be moved upward 164 and downward 166 without having to manually re-adjust the tilt angle TA.

Similarly, if the height H in FIG. 3D is increased by moving the link 125 in the upward direction 164, then the pivot members 177 and 179 will automatically rotate in the counter-clockwise direction 181. Since the pivot members 177 and 179 will rotate counter-clockwise 181, the monitor support member 130 will also automatically rotate in the counter-clockwise direction 181 and the tilt angle TA will decrease in value. As shown from FIGS. 3D to 3A, as the height H is increased, the tilt angle TA is decreased.

In FIG. 3D, the height H is at a minimum value and the tilt angle TA is at a maximum value. Therefore, a suitable LCD panel (which is attached to the monitor support member 130) can be used as a computer writing tablet, when height H is decreased to a sufficient value and the tilt angle TA is increased to a sufficient value.

FIGS. 4A to 4F are various views that shows additional details of a computer monitor base 100A, in accordance with an embodiment of the invention. The springs 155 and 162 provides a spring loaded force that balances the weight of the computer monitor 105, so that the user is not required to manually lift the computer monitor 105. The springs 155 and 162 provides spring resistance to the top links 140*a* and 140*b*, respectively. The springs 155 and 162 are coupled to the top links 140*a* and 140*b*, respectively, in a suitable manner so that the springs 155 and 162 provide spring resistance force to the top links 140*a* and 140*b*, respectively, when the height H of the links 140*a* and 140*b* are moved or adjusted by the user (i.e., when the links 140*a* and 140*b* are moved to another position).

Similarly, springs 405*a* and 405*b* provides spring resistance to the bottom links 145*a* and 145*b*. The springs 405*a* and 405*b* are coupled to the bottom links 145*a* and 145*b*, respectively, in a suitable manner so that the springs 405*a* and 405*b* provide spring resistance force to the bottom links 145*a* and 145*b*, respectively, when the height H of the links 145*a* and 145*b* are moved or adjusted by the user (i.e., when the links 145*a* and 145*b* are moved to another position).

The springs 155, 162, 405*a*, and 405*b* form a spring mechanism that permits adjustment of the height of a computer monitor with minimal efforts from the user, in accordance with an embodiment of the invention.

In an embodiment, the springs 155/162 and 405*a*/405*b* are less loaded in a higher position (where H has a high value) than in a lower position (where H has a low value). Therefore, the force of the springs 155/162 and 405*a*/405*b* counter-balances the weight of the computer monitor 105 in every position that depends on the value of height H. The spring K force values may set to appropriate values by use of techniques that are known in the art, so that the springs 155/162 and 405*a*/405*b* can provide the desired resistance.

Figure 5:
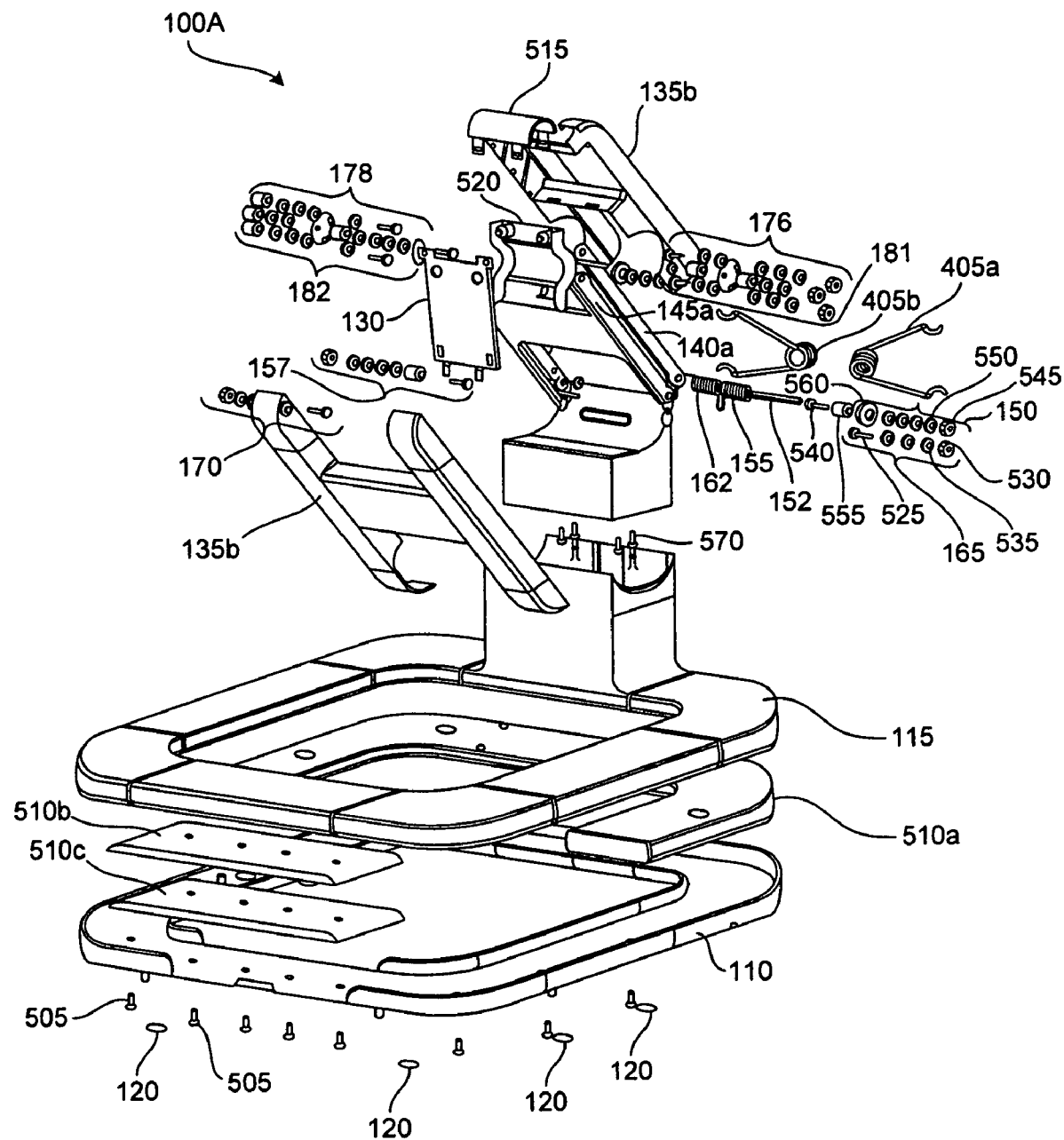
FIG. 5 is a block diagram that shows various additional elements of the computer monitor base of FIGS. 4A to 4F, in accordance with an embodiment of the invention.

FIG. 5 is a block diagram that shows various additional elements of the computer monitor base 100A of FIGS. 4A to 4F. Screws 505 may be used to attach the base bottom portion 110 to the cover 115. Optional elements 510*a*, 510*b*, and 510*c* may be used to provide additional weight to the base bottom portion 110. The base bottom portion 110*a* may have other configurations and is not limited to the example configuration that is shown in FIG. 5.

Covers 515 and 520 may be used to cover the bar link 125 and monitor support member 130, respectively. The configuration of the covers 515 and 520 may be varied to other suitable shapes and sizes.

The screw element 165 may include suitable parts such as, for example, screw 525, screw nut 530, and one or more washers 535. Similarly, screw element 150 may include suitable parts such as, for example, screw 540, screw nut 545, one or more washers 550, sleeve 555, and washer 560. Similarly, screw element 181 and screw element 176 may include similar suitable parts, such as, for example, the washers, sleeves, screws, and screw nuts that are shown in FIG. 5. The screw elements 170, 157, 182, and 178 may include similar suitable parts as shown in FIG. 5. It is noted that the parts in a screw element in FIG. 5 may differ and may have other suitable configurations to achieve their intended functionality as described above. Other components in FIG. 5 may be varied or modified into other suitable configuration in order to provide a computer monitor base, where the height H of the link 125 (FIG. 2) determines or is linked to the tilt angle TA of the monitor support member 130, as previously described above.

Figure 6:
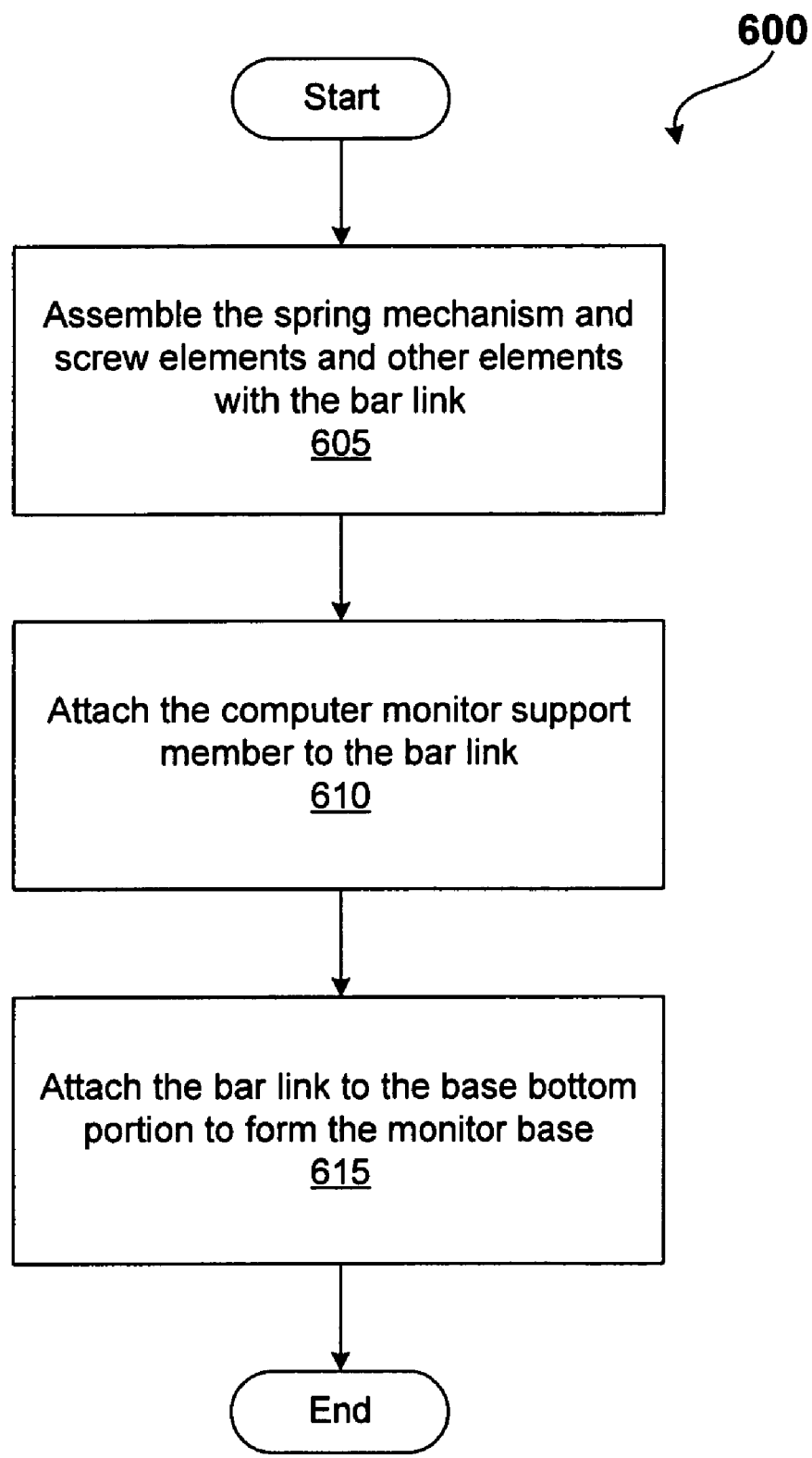
FIG. 6 is flowchart of a method of assembling a computer monitor base, in accordance with an embodiment of the invention.
Figure 7A:
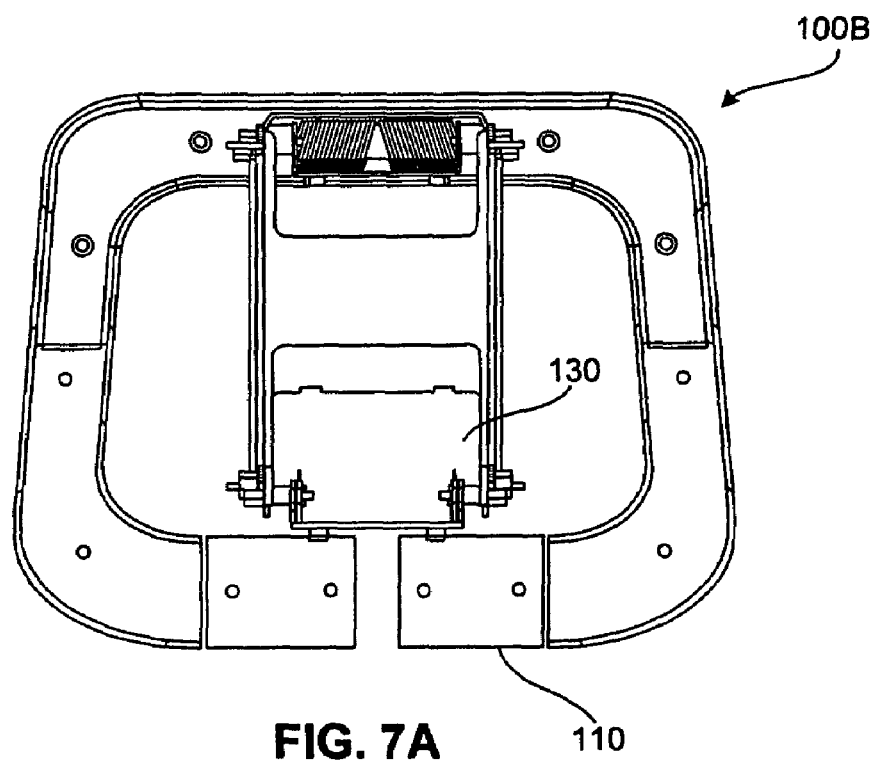
FIGS. 7A to 7F are block diagrams of various views that shows additional details of another embodiment of a computer monitor base, in accordance with an embodiment of the invention.
Figure 7B:
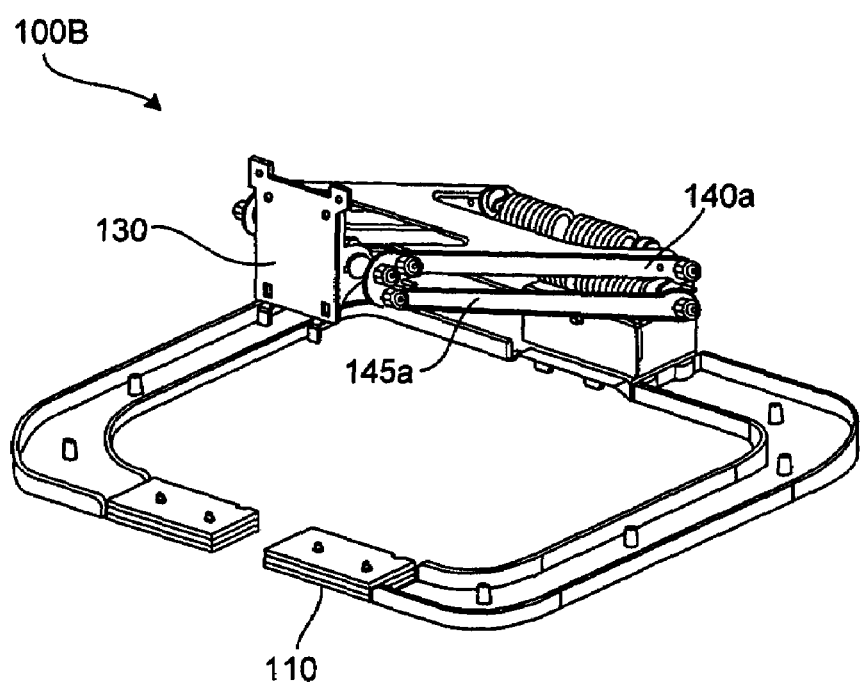
Figure 7C:
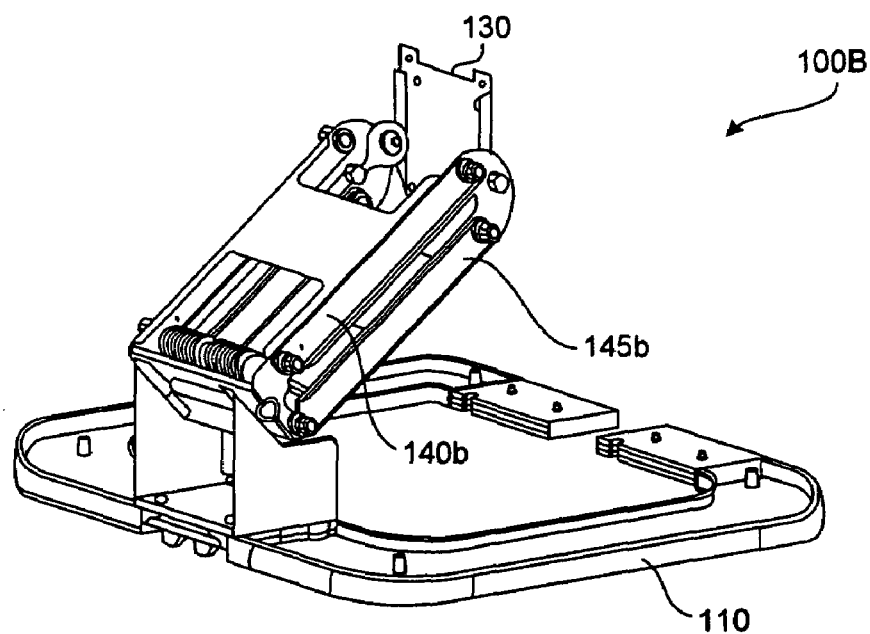
Figure 7D:
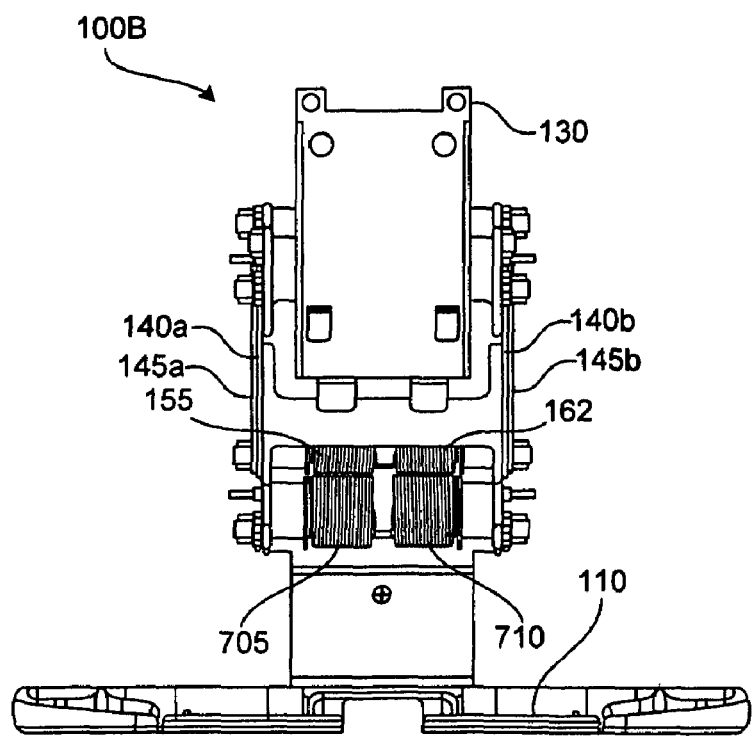
Figure 7E:
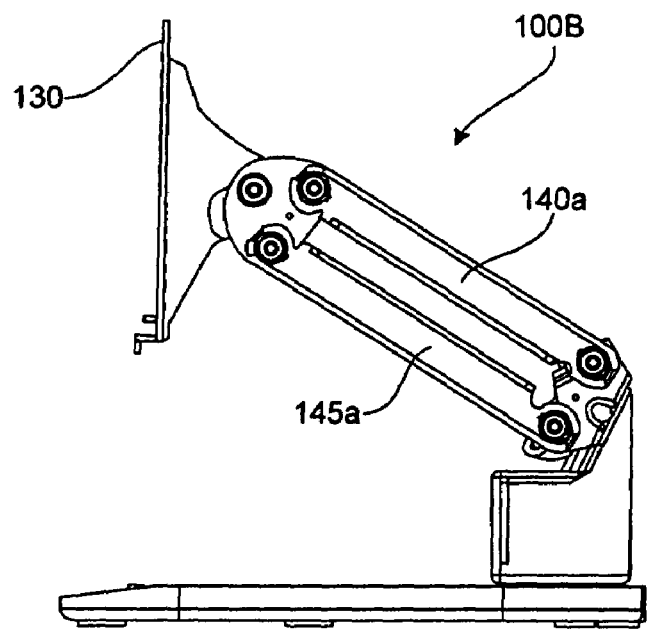
Figure 7F:
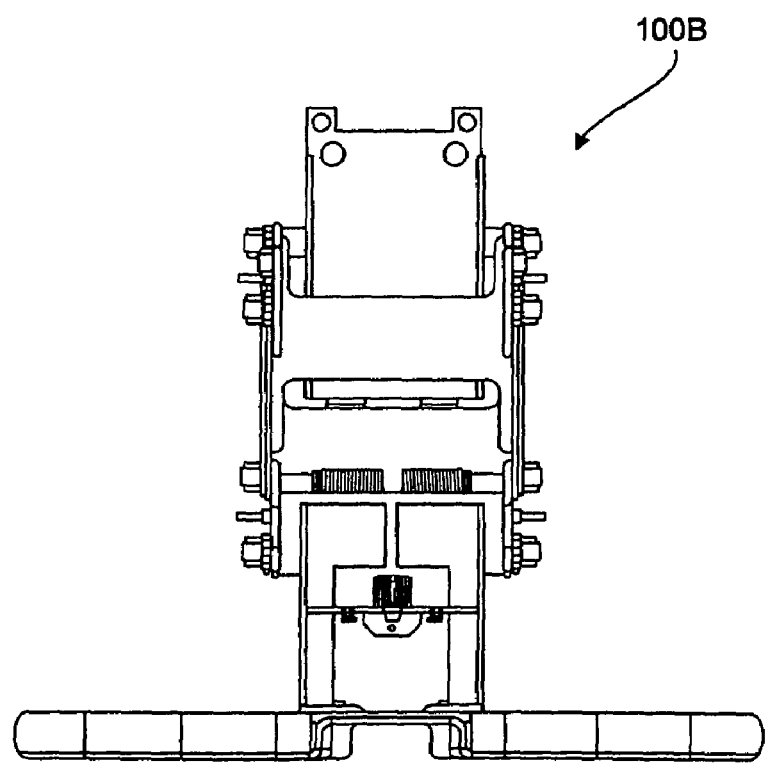

FIG. 6 is block diagram of a method 600 of assembling a computer monitor base, in accordance with an embodiment of the invention. To assemble a computer monitor base, the spring mechanism (formed by springs 155, 162, 405*a*, and 405*b*) and screw elements 165, 150, 170, 157, 181, 176, 182, and 178, and other elements shown in FIG. 5 are assembled in or with the bar link 125 (step 705). The computer monitor support member 130 is then attached to the bar link 125 (step 710). The bar link 125 (formed by links 140*a*, 140*b*, 145*a*, and 145*b*) are then attached to the base bottom portion 110 by use of suitable attachment elements such as, for example, the screws 570 (step 715), so that the computer monitor base 100 is formed.

FIGS. 7A to 7F are various views that shows additional details of a computer monitor base 100B, in accordance with another embodiment of the invention. The springs 155 and 162 provides a spring loaded force that balances the weight of the computer monitor 105, so that the user is not required to manually lift the computer monitor 105, as discussed above. The springs 155 and 162 (FIG. 7D) provides spring resistance to the top links 140*a* and 140*b*, respectively.

Similarly, springs 705 and 710 (FIG. 7D) provides spring resistance to the bottom links 145*a* and 145*b*. The springs 705 and 710 are coupled to the bottom links 145*a* and 145*b*, respectively, in a suitable manner so that the springs 705 and 710 provide spring resistance force to the bottom links 145*a* and 145*b*, respectively, when the height H of the links 145*a* and 145*b* are moved or adjusted by the user (i.e., when the links 145*a* and 145*b* are moved to another position).

The springs 155, 162, 705, and 710 form a spring mechanism that permits adjustment of the height of a computer monitor with minimal efforts from the user, in accordance with an embodiment of the invention.

In an embodiment, the springs 155/162 and 705/710 are less loaded in a higher position (where H has a high value) than in a lower position (where H has a low value). Therefore, the force of the springs 155/162 and 705/710 counter-balances the weight of the computer monitor 105 in every position that depends on the value of height H. The spring K force values may set to appropriate values by use of techniques that are known in the art, so that the springs 155/162 and 705/710 can provide the desired resistance.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for supporting a computer monitor, the apparatus comprising:
   a computer monitor base, including:
      a bottom portion for placement on a surface;
      a link coupled to the bottom portion; and
      a monitor support member coupled to the link,
      wherein a tilt angle of the monitor support member is dependent on an adjustable height of the link, wherein the link comprises a top bar and a bottom bar;
         wherein the tilt angle increases and the top bar will slide in a first direction and the bottom bar will slide in a second direction which is opposed to the first direction, in response to a decrease in the adjustable height of the link;
         wherein the tilt angle decreases and the top bar will slide in the second direction and the bottom bar will slide in the first direction, in response to an increase in the adjustable height.

2. The apparatus of claim 1, wherein the monitor support member is configured to be attached to a computer monitor.

3. The apparatus of claim 2, wherein the computer monitor is a liquid crystal display.

4. The apparatus of claim 2, wherein the tilt angle determines a tilt of the computer monitor.

5. The apparatus of claim 2, wherein the height of the link determines a height of the computer monitor.

6. The apparatus of claim 2, further comprising:
   a plurality of springs coupled to the link and configured to counter-balance a weight of the computer monitor that is attached to the monitor support member.

7. The apparatus of claim 1, wherein the tilt angle increases in response to a decrease in the height of the computer monitor.

8. The apparatus of claim 1, wherein the tilt angle decreases in response to an increase in the height of the computer monitor.

9. The apparatus of claim 1, wherein the link comprises a first pair of top and bottom links, and a second pair of top and bottom links.

10. The apparatus of claim 9, further comprising:
    a plurality of springs coupled to the link and configured to provide spring resistance to the link when the link moves to another position.

11. The apparatus of claim 10, wherein the plurality of springs comprises:
    a first spring coupled to the top link in the first pair of links and configured to provide spring resistance to the top link in the first pair of links;
    a second spring coupled to the bottom link in the first pair of links and configured to provide spring resistance to the bottom link in the first pair of links;
    a third spring coupled to the top link in the second pair link and configured to provide spring resistance to the top link in the second pair of links; and
    a fourth spring coupled to the bottom link in the second pair link and configured to provide spring resistance to the bottom link in the second pair of links.

12. The apparatus of claim 1, further comprising:
    at least once cover for covering at least a portion of the link.

13. A method of assembling an apparatus for supporting a computer monitor, the method comprising:
    assembling a bar link that includes a spring mechanism and screw elements;
    attaching a computer monitor support member to the bar link, wherein the bar link comprises a top bar and a bottom bar; and
    attaching the bar link to a base bottom portion;
    wherein a tilt angle of the computer monitor increases and the top bar will slide in a first direction and the bottom bar will slide in a second direction which is opposed to the first direction, in response to a decrease in the adjustable height of the link;
    wherein the tilt angle of the computer monitor decreases and the top bar will slide in the second direction and the bottom bar will slide in the first direction, in response to an increase in the adjustable height.

14. An apparatus produced in accordance with the method of claim 13.

15. The method of claim 13 wherein the monitor support member is configured to be attached to a computer monitor.

16. The method of claim 15, wherein the computer monitor is a liquid crystal display.

17. The method of claim 13, wherein the monitor support member has a tilt angle that determines a tilt of a computer monitor.

18. The method of claim 13, wherein the bar link has a height that determines a height of a computer monitor.

19. The method of claim 13, wherein the spring mechanism comprises:

a plurality of springs coupled to the bar link and configured to counter-balance a weight of a computer monitor that is attached to the monitor support member.

20. The method of claim 13, wherein the monitor support member has a tilt angle that increases in response to a decrease in height of the bar link.

21. The method of claim 13, wherein the monitor support member has a tilt angle that decreases in response to an increase in height of the bar link.

22. The method of claim 13, wherein the bar link comprises a pair of top and bottom links, and a second pair of top and bottom links.

23. The method of claim 13, further comprising:
attaching at least once cover for covering at least a portion of the link.

24. An apparatus for supporting a computer monitor, the apparatus comprising:
a computer monitor base, including:
means for placing the computer monitor base on a surface;
coupled to the means for placing, means for supporting a monitor and for providing a tilt angle to the monitor; and coupled to the means for supporting, means for providing an adjustable height to a link, wherein the tilt angle is dependent on the adjustable height of the link, wherein the link comprises a top bar and a bottom bar;

wherein the tilt angle increases and the top bar will slide in a first direction and the bottom bar will slide in a second direction which is opposed to the first direction, in response to a decrease in the adjustable height of the link;

wherein the tilt angle decreases and the top bar will slide in the second direction and the bottom bar will slide in the first direction, in response to an increase in the adjustable height.

* * * * *